United States Patent
Yamazaki

(10) Patent No.: US 7,203,444 B2
(45) Date of Patent: Apr. 10, 2007

(54) METHOD AND APPARATUS FOR IMAGE FORMING AND OPTICAL WRITING DEVICE INSTALLED THEREIN CAPABLE OF REDUCING ADHERING DUST

(75) Inventor: Kozo Yamazaki, Kamakura (JP)

(73) Assignee: Ricoh Company Ltd., Tokyo (JP)

( * ) Notice: Subject to any disclaimer, the term of this patent is extended or adjusted under 35 U.S.C. 154(b) by 367 days.

(21) Appl. No.: 10/807,322

(22) Filed: Mar. 24, 2004

(65) Prior Publication Data
US 2004/0240905 A1 Dec. 2, 2004

(30) Foreign Application Priority Data
Mar. 28, 2003 (JP) .............................. 2003-092818

(51) Int. Cl.
G03G 21/00 (2006.01)
G03G 21/20 (2006.01)
B41J 2/385 (2006.01)
G03B 27/52 (2006.01)

(52) U.S. Cl. .......................... 399/98; 399/92; 347/136; 355/30

(58) Field of Classification Search ................ 347/257; 399/92; 250/239; 355/30; 39/98
See application file for complete search history.

(56) References Cited

U.S. PATENT DOCUMENTS

| 4,074,217 | A | * | 2/1978 | Yanagawa | ..................... 355/30 |
| 4,853,710 | A | | 8/1989 | Shimada et al. | |
| 5,663,558 | A | * | 9/1997 | Sakai | ......................... 250/234 |
| 6,029,028 | A | * | 2/2000 | Inoue | .......................... 399/92 |
| 6,151,057 | A | | 11/2000 | Yamazaki et al. | |

FOREIGN PATENT DOCUMENTS

| JP | 63-075764 | 4/1988 |
| JP | 64-079781 | 3/1989 |
| JP | 1-155066 | 10/1989 |
| JP | 2949826 | 7/1999 |
| JP | 2002-031919 | 1/2002 |
| JP | 2002-131997 | 5/2002 |

OTHER PUBLICATIONS

JPO Computer translation of JP2002131997.*

* cited by examiner

*Primary Examiner*—Hai Pham
*Assistant Examiner*—Carlos Martinez, Jr.
(74) *Attorney, Agent, or Firm*—Oblon, Spivak, McClelland, Maier & Neustadt, P.C.

(57) ABSTRACT

A method and apparatus of image forming includes an optical writing device and an image carrier. The optical writing device includes a housing, a dustproof member, a light source, and a shield. The housing is provided with an opening. The dustproof member is light permeable and closes the opening. The light source is installed in the housing and irradiates the image carrier with a light beam through the dustproof member. The shield is movable between a first position to cover the dustproof member and a second position to uncover the dustproof member. The optical writing device also includes a cleaner attached to the shield and contact the dustproof member. The optical writing device also includes a driver for moving the shield. The optical writing device further includes a positioning mechanism for positioning the shield to the first position by using the driver.

31 Claims, 6 Drawing Sheets

METHOD AND APPARATUS FOR IMAGE FORMING AND OPTICAL WRITING DEVICE INSTALLED THEREIN CAPABLE OF REDUCING ADHERING DUST

This application claims priority to Japanese patent application No. JPAP2003-092818 filed on Mar., 28, 2003 in the Japan Patent Office, the entire contents of which are incorporated by reference herein.

BACKGROUND OF THE INVENTION

1. Field of the Invention

The present invention relates to a method and apparatus for image forming, and more particularly to a method and apparatus for image forming capable of reducing an amount of particles of toner and/or dust adhering onto a dustproof member in an image forming apparatus, and cleaning the adhering particles off the dustproof member with a simple configuration.

2. Discussion of the Background

There has been a growing demand for an electrophotographic image forming apparatus, like an image forming apparatus or a digital copier, to generate a high-quality image at high speed, and to be space-saving and energy-efficient, as well. Consequently, a demand has also been rising for a high performance optical system adopted in an optical writing device installed in the image forming apparatus.

An image forming apparatus generally uses developer, such as toner, that inevitably scatters inside the apparatus to some extent. The image forming apparatus also contains dust flowing therein. An optical writing device is susceptible to toner or dust to because of its characteristics. In order to prevent toner or dust from entering, the optical writing device encloses various components, like a light source, inside its housing. The housing of such an optical writing device is provided with an aperture shielded with a dustproof member capable of letting through a light beam.

The dustproof member is exposed to toner or dust existing inside the image forming apparatus. The toner or dust adhering to the dustproof member may cause quality deterioration of the optical writing device. This needs to be avoided as it may further lead undesirable deterioration of an image to be generated.

Japanese Patent Laid-Open Application Publication No. 01-155066 describes, for example, a technique of arranging a cleaning member to a dustproof member in which the cleaning member is attachable/detachable to a supporting member while the dustproof member is attachable/detachable to an aperture.

Japanese Patent No. 2949826 describes, for example, a technique in which an optical member, i.e., a dustproof member, is slidably attached to an aperture, and a cleaning member is arranged at an end of the aperture.

The above techniques allow the dustproof member or the optical member to be cleaned by way of its attaching or detaching operation.

However, since the above techniques merely remove toner or dust adhering to the dustproof member, it gives no effect on an amount of the toner or dust.

It is therefore preferable to provide a configuration of an image forming apparatus capable of reducing the amount of the toner or dust adhering to the dustproof member, and cleaning them off with a simpler structure.

SUMMARY OF THE INVENTION

In view of the foregoing, it is an object of the present invention to provide a novel optical writing device which reduces an amount of toner or dusts adhering on a dustproof member causing deterioration of an image to be generated, and cleans the toner or dusts on the dustproof member with a simple configuration.

Another object of the present invention is to provide a novel optical writing method which reduces an amount of toner or dusts adhering on a dustproof member causing deterioration of an image to be generated, and cleans the toner or dusts on the dustproof member with a simple configuration.

To achieve these and other objects, in one example, the present invention provides a novel optical writing device including a housing, a dustproof member, a light source, and a shield. The housing is provided with an opening. The dustproof member is light permeable and closes the opening. The light source is installed in the housing and irradiates an image carrier with a light beam through the dustproof member. The shield is movable between a first position to cover the dustproof member and a second position to uncover the dustproof member.

The optical writing device may further include a cleaner attached to the shield and contacting the dustproof member.

The optical writing device may further include a driver for moving the shield.

The optical writing device may further include a positioning mechanism for positioning the shield to the first position by using the driver.

To achieve these and other objects, in another example, the present invention provides a novel image forming apparatus for electrophotographic image forming includes an image carrier and an optical writing device. The image carrier carries an image formed with irradiation of a light beam. The optical writing device includes a housing, a dustproof member, a light source, and a shield. The housing is provided with an opening. The dustproof member is be light permeable and closes the opening. The light source is installed in the housing and irradiates the image carrier with the light beam through the dustproof member. The shield is movable between a first position to cover the dustproof member and a second position to uncover the dustproof member.

The image forming apparatus may include the optical writing device further including a cleaner attached to the shield and contacting the dustproof member.

The image forming apparatus may include the optical writing device further including a driver for moving the shield.

The image forming apparatus may include the optical writing device further including a positioning mechanism for positioning the shield to the first position by using the driver while an image forming operation of the image forming apparatus is inactive.

The image forming apparatus may further include a driver for moving the shield.

The image forming apparatus may further include a positioning mechanism for positioning the shield to the first position by using the driver while an image forming operation of the image forming apparatus is inactive.

To achieve these and other objects, in another example, the present invention provides a novel image forming apparatus for electrophotographic image forming includes an image carrier, an optical writing device, and a shield. The image carrier carries an image formed with irradiation of a light beam. The optical writing device includes a housing, a dustproof member, and a light source. The housing is provided with an opening. The dustproof member is light permeable and closes the opening. The light source is installed in the housing and irradiates the image carrier with the light beam through the dustproof member. The shield is movable between a first position to cover the dustproof member and a second position to uncover the dustproof member.

The image forming apparatus may further include a cleaner attached to the shield and contacting the dustproof member.

The image forming apparatus may further include a driver for moving the shield.

The image forming apparatus may further includes a positioning mechanism for positioning the shield to the first position by using the driver while an image forming operation of the image forming apparatus is inactive.

This patent specification further describes a novel method of optical writing used in an image forming method. In one example, the novel method includes the steps of storing an optical writing mechanism, closing a housing, emitting a light beam, and moving a shield. The storing step stores an optical writing mechanism into the housing having an opening. The closing step closes the opening with a light-permeable dustproof member. The emitting step emits the light beam from inside the housing for irradiating an external image carrier through the opening and the dustproof member. The moving step moves the shield between a first position at which the shield covers the light-permeable dustproof member when the optical writing mechanism is inactivated, and a second position at which the shield uncovers the light-permeable dustproof member.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
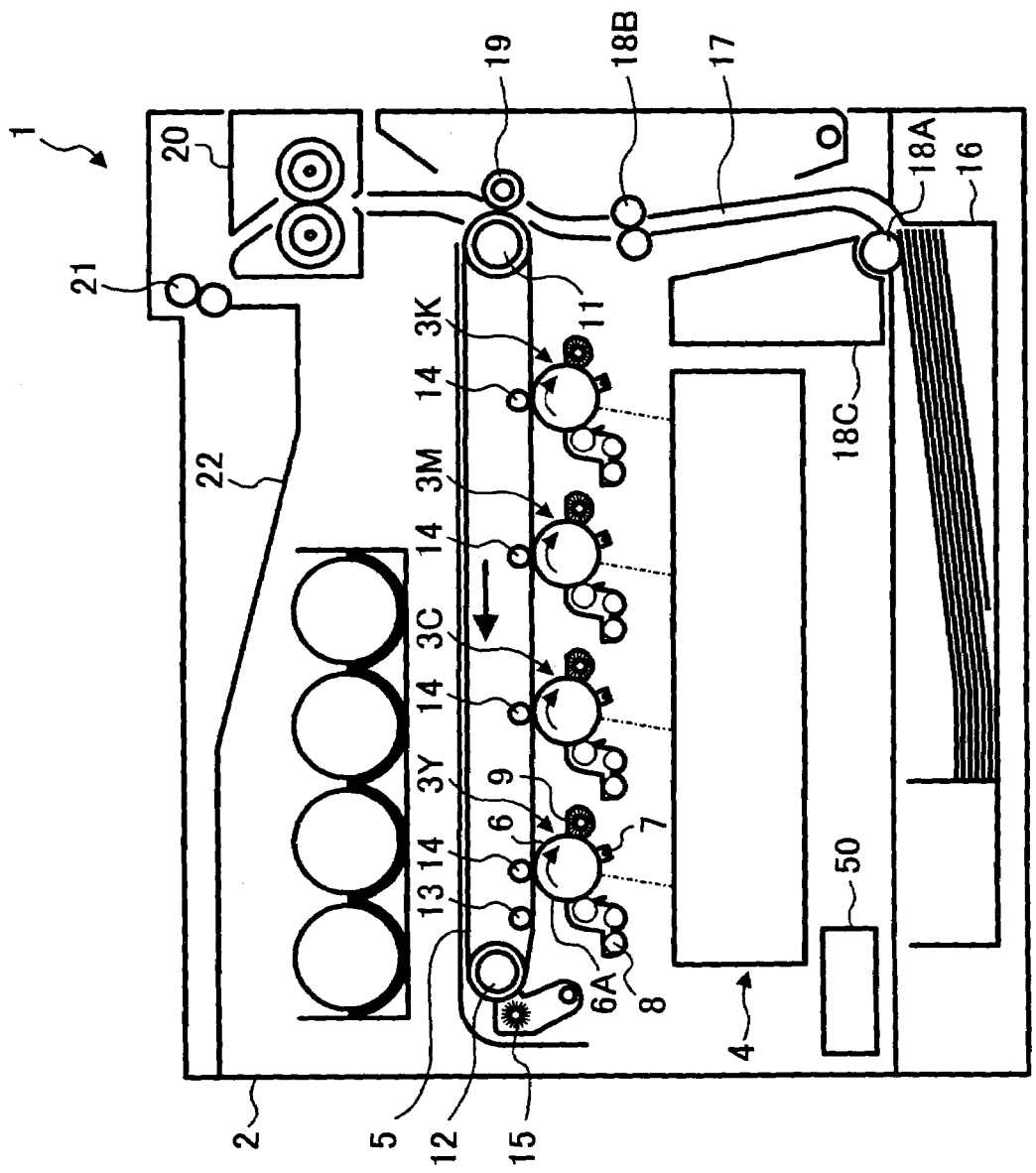
FIG. 1 is a schematic side sectional view showing one exemplary embodiment of an image forming apparatus according to the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an image forming apparatus 1 according to an exemplary embodiment of the present invention is described. In FIG. 1, the optical disk recording apparatus 1 includes a main body 2, image generating mechanisms 3Y, 3C, 3M, and 3K (hereinafter referred to as image mechanisms 3 as appropriate), an optical writing device 4, and an intermediate transfer belt 5. Each of the image generating mechanisms 3 is provided with a photoconductor 6, an outer surface 6A of the photoconductor 6, a charging unit 7, a developing unit 8, and a cleaning unit 9. The image forming apparatus 1 further includes a first roller 11, a second roller 12, a third roller 13, transfer rollers 14, a cleaning unit 15, a paper feeding cassette 16, a sheet conveying path 17, a paper feeding roller 18A, a pair of registration rollers 18B, a supporting member 18C, an intermediate transfer roller 19, a fusing unit 20, a pair of paper ejecting rollers 21, a paper ejecting tray 22, and a control unit 50.

In an area substantially central in the main body 2 of the image forming apparatus 1, the four image generating mechanisms 3Y, 3C, 3M, and 3K, the optical writing device 4, and the intermediate transfer belt 5 are arranged, as shown in FIG. 1. Each of the image generating mechanisms 3 forms an image of a separated color, i.e., a toner image. In the present specification and drawings, the image generating mechanism 3 and components included therein are sometimes referred to with reference numerals accompanied by an alphabetical letter Y, C, M, or B representing yellow, cyan, magenta, or black color, respectively.

Besides the color of the toner and an image generated thereby, the four image generating mechanisms 3Y, 3C, 3M, and 3K have configurations basically identical.

Each image generating mechanism 3 includes the corresponding photoconductor 6 surrounded by the charging unit 7, the developing unit 8, the cleaning unit 9, and the like. The photoconductor 6 is an image carrier and driven to rotate in a direction indicated by a curved arrow.

The photoconductor 6 formed as a cylindrical shape is driven to rotate by a driving source (not shown). The photoconductor 6 is provided with a photoconductive layer on its rounding outer surface. The outer surface 6A of the photoconductor 6 is a surface to be scanned. The optical writing device 4 irradiates the outer surface 6A of the photoconductor 6 with a light beam, thereby writing a latent image corresponding to image information onto the outer surface 6A.

The charging unit 7 uniformly charges the outer surface 6A of the photoconductor 6. The present embodiment adopts a non-contact type charging unit which do not contact the photoconductor 6.

The developing unit 8 supplies the photoconductor 6 with toner which adheres onto the latent image written on the outer surface 6A of the photoconductor 6, thereby visualizing the latent image as a toner image. The present embodiment adopts a non-contact type developing unit which do not contact the photoconductor 6.

The cleaning unit 9 cleans off remaining toner adhering onto the outer surface 6A of the photoconductor 6. The present embodiment adopts a brush-contacting type cleaning unit having a brush contacting the outer surface 6A of the photoconductor 6.

The intermediate transfer belt 5 onto which the toner image is transferred from the photoconductor 6 is a loop-shaped belt formed with resin film or rubber as its base. The intermediate transfer belt 5 supported with the first roller 11, the second roller 12, and the third roller 13 is driven to rotate in a direction indicated with a straight horizontal arrow shown in FIG. 1. On an inner radius, in other words, inside the loop of the intermediate transfer belt 5, four transfer rollers 14 are arranged as pressing the intermediate transfer belt 5 against the photoconductors 6 so that the toner image is transferred from each of the photoconductors 6 onto the intermediate transfer belt 5. Outside the loop of the intermediate transfer belt 5, a side of the outer surface 6A, in other words, the cleaning unit 15 is placed for cleaning remaining toner or paper dust adhering onto the outer surface 6A.

Inside the main body 2 below the four image generating mechanisms 3 and the optical writing device 4, the paper feeding cassette 16 is installed to hold recording medium or sheets stacked therein. Of the recording medium stacked in the paper feeding cassette 16, a sheet on the top is separated to be fed one by one.

The conveying path 17 is arranged in the main body 2 for conveying the recording sheet separated and fed from the paper feeding cassette 16. On the conveying path 17, the paper feeding roller 18A, the pair of registration rollers 18B, the fusing unit 20, the paper ejecting rollers 21, or the like are arranged.

The pair of registration rollers 18B is driven to rotate periodically according to a predetermined timing. The periodical rotation of the pair of registration rollers 18B further conveys the recording sheet staying at the pair of registration rollers 18B to a transfer position. At the transfer position, that is, between the intermediate transfer belt 5 and the intermediate transfer roller 19, the toner image is transferred onto the recording sheet from the intermediate transfer belt 5. The intermediate transfer belt 5 and the intermediate transfer roller 19 at this position form a transfer mechanism.

The fusing unit 20 heats and presses to fix the transferred toner image onto the recording sheet. The recording sheet has the toner image fixed in a course of passing through the fusing unit 20. The pair of paper ejecting rollers 21 ejects the recording sheet onto the paper ejecting tray 22 arranged on topside of the main body 2.

The image forming apparatus 1 in the above example is provided with the control unit 50 including CPU, ROM, and RAM for centrally controlling driving of each unit installed therein.

Figure 2:
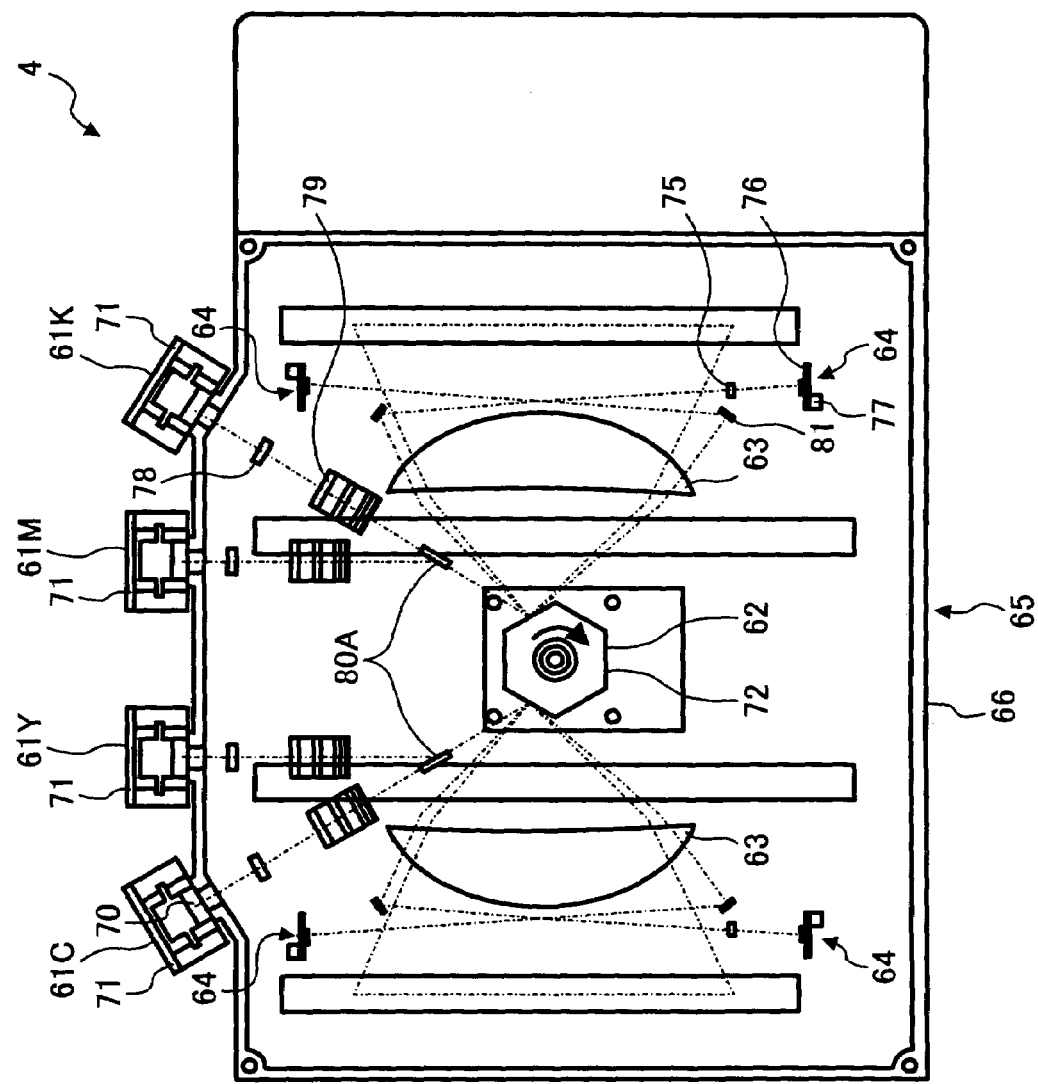
FIG. 2 is a schematic top sectional view showing an optical writing device in the image forming apparatus in FIG. 1.
Figure 3:
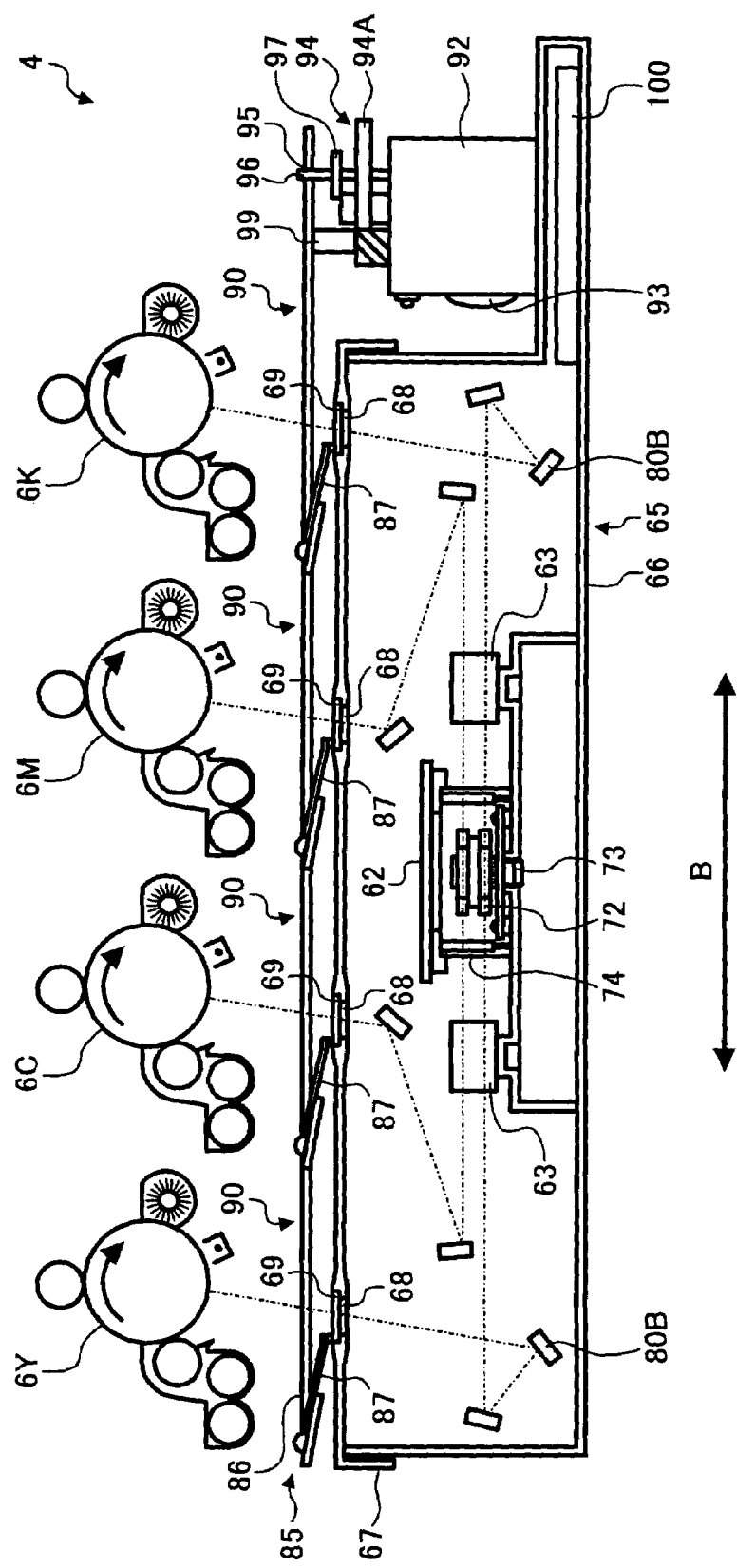
FIG. 3 is a schematic side sectional view showing the optical writing device in FIG. 2 and other related mechanisms installed in the image forming apparatus in FIG. 1.

Referring now to FIGS. 2 and 3, the optical writing device 4 will be described in detail. As shown in FIGS. 2 and 3, the optical writing device 4 includes laser light source units (LD units) 61 (61Y, 61C, 61M, and 61K), a light deflector 62, optical image forming systems 63, synchronous detectors 64, a housing 65, a main housing 66, and a cover 67. The optical writing device 4 also includes apertures 68, dustproof members 69, semiconductor lasers 70, supporting members 71, rotating polygon mirrors 72, polygon mirror motor 73, a soundproof glass 74, imaging lenses 75, photoelectric elements 76, and electric circuit boards 77. The optical writing device 4 is also provided with face tangle error correction apertures 78, cylinder lenses 79, first mirrors 80A, second mirrors 80B, and synchronous detecting mirrors 81. The optical writing device 4 is further provided with a shielding unit 85, a stay 86, shielding members 87, openings 90, cleaning members 91, a driving unit 92, a motor 93, a set of gears 94, a gear 94A, a hole 95, a pin 96, a lever 97, a protrusion 99, and a control unit 100.

As shown in FIGS. 2 and 3, the optical writing device 4 adopts so-called an opposed type scanning mechanism. The four LD units 61Y, 61C, 61M, and 61K oscillate light beams. In the optical writing device 4, the light deflector 62 distributes the light beams into two opposite directions to perform deflecting scan. The optical image forming system 63 including such as an fθ lens forms a predetermined-sized image based on the light beam deflecting scanned onto the photoconductor 6. The synchronous detector 64 detects timing to start scanning of the light beam. The above components are stored in the housing 65. The housing 65 includes the main housing 66 with no topside wall, and the cover 67 covering the topside of the main housing 66. The cover 67 is provided with the apertures 68 through which the light beam passes. The dustproof member 69 that is made of a flat glass plate is attached to the aperture 68.

The laser light source unit 61 is provided with the semiconductor laser 70 as a light source, a collimate lens (not shown), a semiconductor laser driving circuit board, and the supporting member 71 which supports the other components. The collimate lens collimates a diverging light emitted from the semiconductor laser 70.

The light deflector 62 is provided with the rotating polygon mirrors 72 double-stacked, the polygon mirror motor 73 for rotating the rotating polygon mirrors 72, the soundproofing glass 74 covering the rotating polygon mirrors 72, and so on.

The synchronous detector 64 works with the imaging lens 75, the electric circuit board 77 having the photoelectric elements 76, and a supporting member (not shown) which supports the other components.

The optical writing device 4 converts separated colored image data into a signal for driving a light source. The image data may be input from an apparatus (not shown) such as an apparatus for reading an original document like a scanner, or for outputting image data like a personal computer, a word processor, or a receiving unit of a facsimile. According to the signal, the optical writing device 4 drives the semiconductor laser 70 in each laser light source unit 61 to emit a light beam. The light beam emitted from the laser light source 61 passes through the aperture 78 for correcting face tangle error, the cylinder lens 79, the first mirror 80A in a case of the light beam from the laser source units 61Y or 61M, and reaches the light deflector 62. The light beam is deflecting scanned in one of opposing directions by the rotating polygon mirror 72 which is driven by the polygon mirror motor 73 to rotate at constant velocity.

Two of the light beams are deflecting scanned into one of two opposite directions with the rotating polygon mirror 72 of the light deflector 62, while other two light beams are deflecting scanned into another direction. Each light beam passes through one of the optical imaging system 63, changes a traveling direction on the second mirror 80B, passes through the dustproof member 69, and irradiates a scanning surface of the photoconductor 6 to write an electrostatic latent image thereon. The four beams irradiate the corresponding photoconductors 6 with nearly identical incidence angles.

In a meanwhile, the synchronous detector 64 for determining starting timing of writing receives the light beam which passes through the optical imaging system 63 and is reflected on the synchronous detecting mirror 81, thereby outputting a synchronous signal for start of a scanning operation. Since synchronous detection originally aims to detect proper timing of a scanning light beam, the synchronous detector 64 is normally arranged to receive the light beam before start of the scanning operation in order to fill a primal requirement. Furthermore, another detector may additionally be placed at a rear end of a scanning line in order to detect a fluctuation in velocity or time of one scanning operation. FIG. 2 shows such a configuration in which synchronization is detected both preceding and succeeding the scanning operation.

Figure 4:
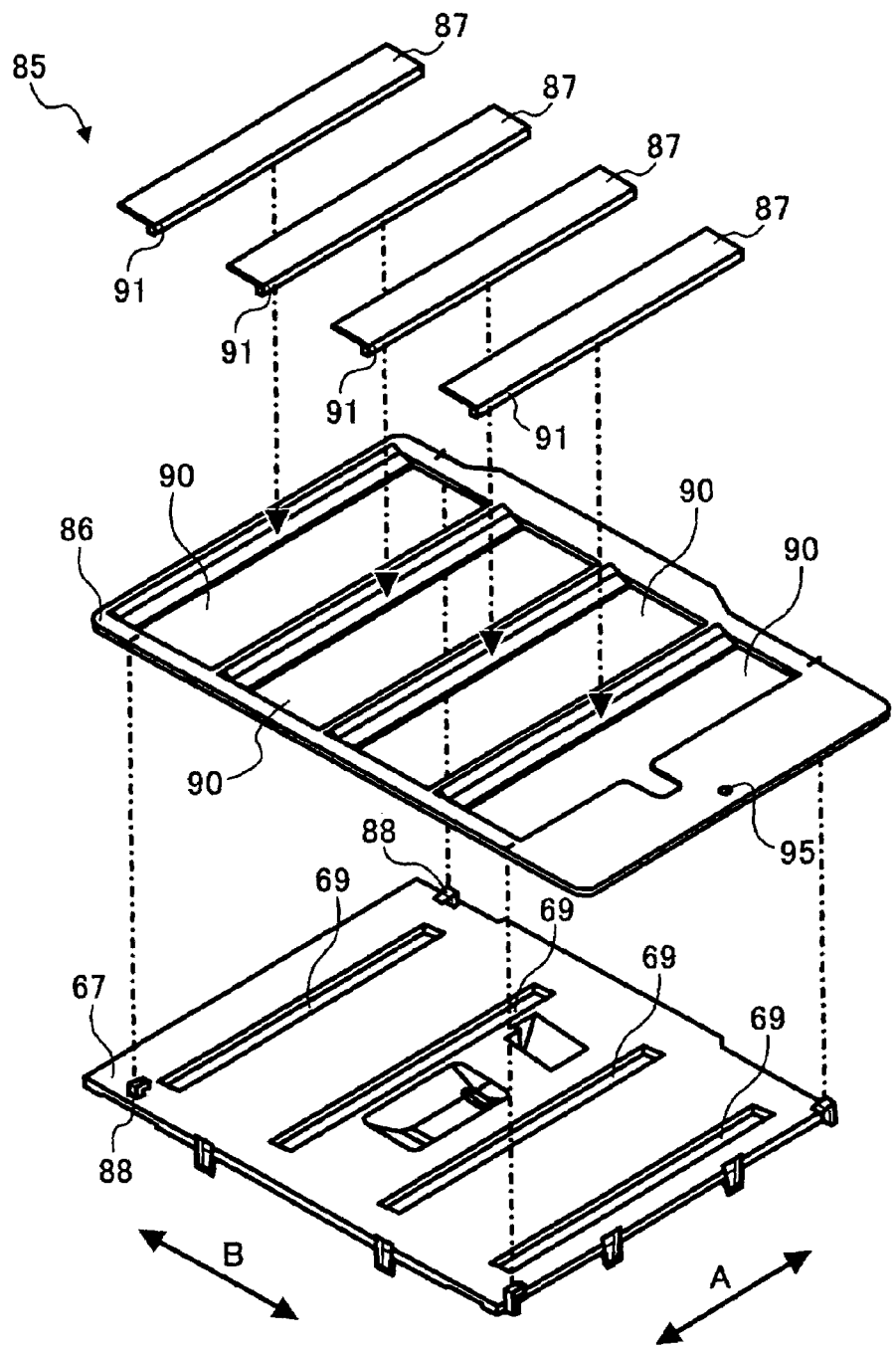
FIG. 4 is an exploded perspective view showing a cover and a shielding unit of the optical writing device in FIG. 3.
Figure 5:
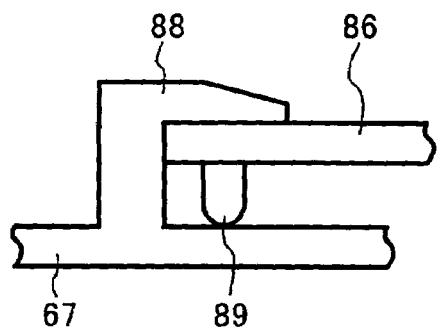
FIG. 5 is an enlarged sectional partial view showing a mechanism of attaching the shielding unit to the cover shown in FIG. 4.
Figure 6A:
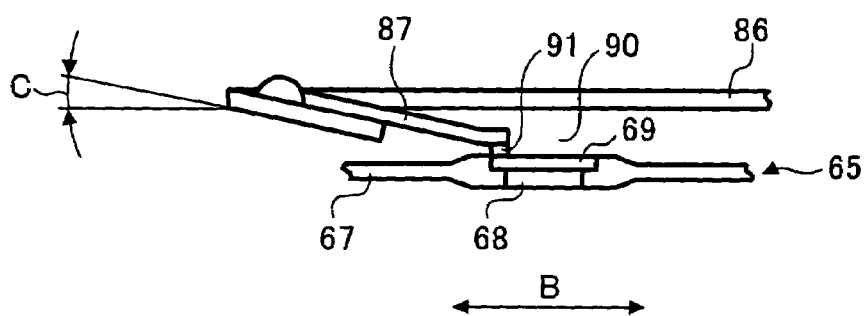
FIG. 6A is a schematic side sectional view showing a dustproof member and the shielding unit shown in FIG. 3, with the shielding unit staying at an open position.

Referring now to FIGS. 3 through 6, the shielding unit 85 will be described in detail. The optical writing device 4 described above includes the cover 67 with the shielding unit 85 attached thereto, as shown in FIG. 3. The optical writing device 4 is further provided with a pair of pawls 88, cleaners 91, a protrusion 89, as shown in FIGS. 4 and 5. A direction A indicated with an arrow A in FIG. 4 shows a deflecting direction, while a direction B indicated with arrows B in FIGS. 4 and 6 shows a perpendicular direction to the direction A. An angle C indicated with an arrow C in FIG. 6A shows an angle set to a part of the stay 86.

The shielding unit 85 is provided with the stay 86 formed with sheet metal, and the shielding members 87, as shown in FIG. 3. The stay 86 is engaged and slidably supported with the pair of pawls 88 attached to the cover 67. The pair of pawls 88 guides the stay 86 in the direction B perpendicular to the direction A i.e., a direction of the light beam deflected with the light deflector 62. The protrusion 89 protrusively formed on a bottom surface of the stay 86 contacts topside of the cover 67, as shown in FIG. 5. This configuration reduces an amount of area in which the stay 86 contacts the cover 67, as well as increasing rigidity of the stay 86.

The stay 86 is provided with four openings 90 each facing one of four corresponding dustproof member 69. The shielding member 87 attaches to the cover 67 as extending to exit its part to the corresponding opening 90. The shielding member 87 is formed to have an enough size to cover the dustproof member 69. The shielding member 87 is made with resin film such as black polyethylene terephthalate, for example. The opening 90 of the stay 86 partly covered with the shielding member 87 is formed to have such a size that its uncovered part exposes the dustproof member 69 to the photoconductor 6.

Figure 6B:
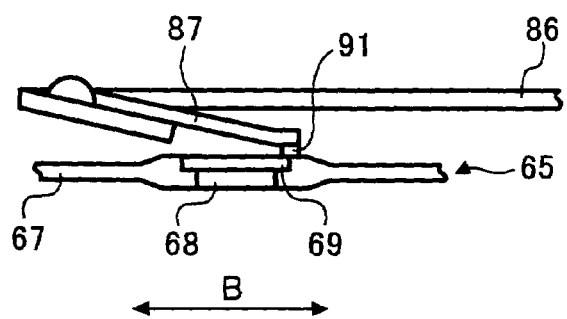
FIG. 6B is a schematic side sectional view showing the dustproof member and the shielding unit shown in FIG. 6A, with the shielding unit staying at a shielding position.

According to the above configuration, the shielding member 87 is slidable between two positions on the cover 67. At one of the two positions, the shielding member 87 uncovers the dustproof member 69, letting the opening 90 expose the dustproof member 69, as shown in FIG. 6A. At another position, the shielding member 87 covers the dustproof member 69, as shown in FIG. 6B.

At a tip of the shielding member 87, the cleaner 91 is attached as contacting the dustproof member 69. The cleaner 91 made from nonwoven fabric contacts the dustproof member 69 with the whole length in the direction A. The cleaner 91 pushes against the dustproof member 69 due to elasticity of the shielding member 87. Contact force of the cleaner 91 against the dustproof member 69 is variable depending on the angle C of a part of the stay 86 at which the shielding member 87 is attached.

Figure 7:
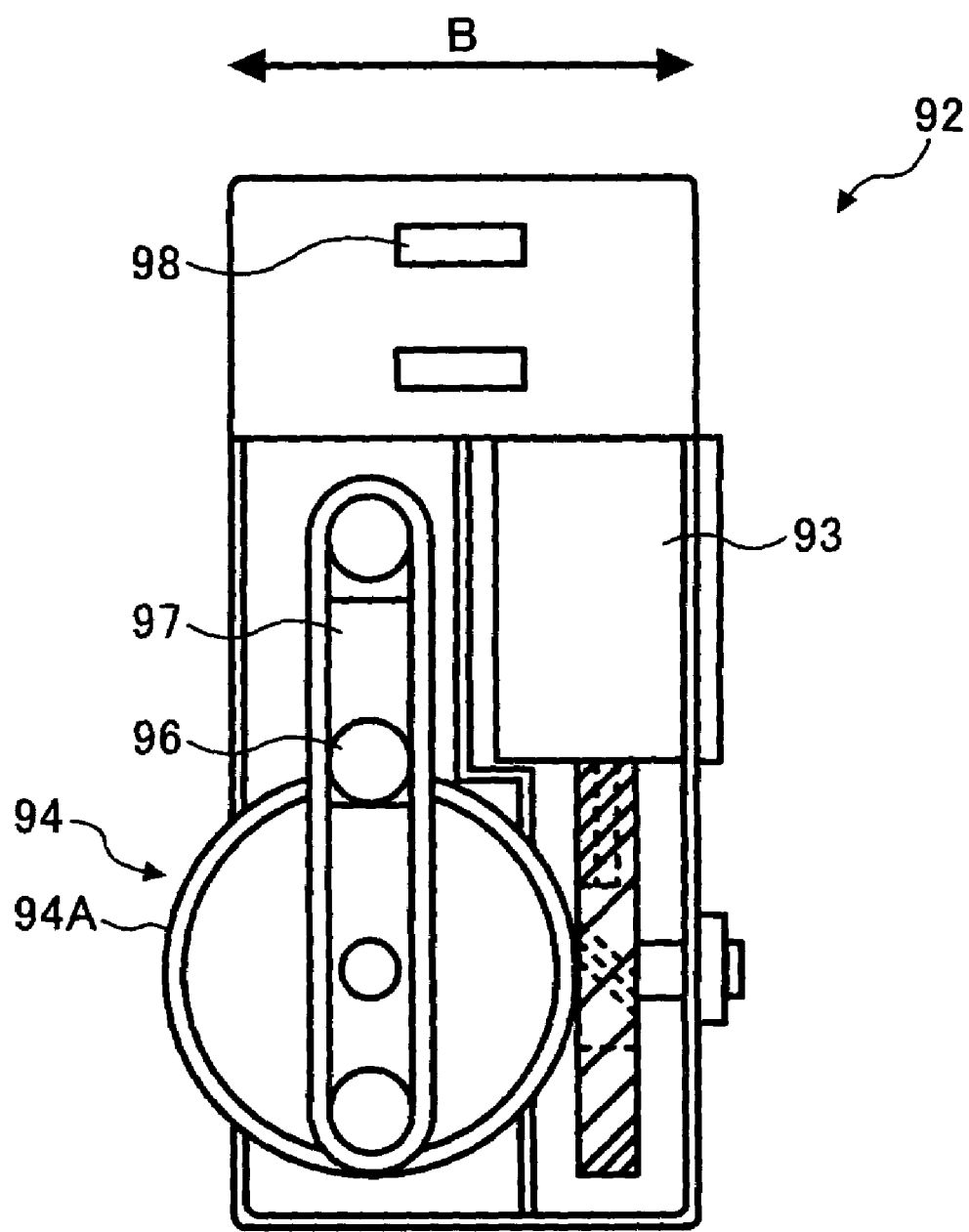
FIG. 7 is a schematic top view showing a driving unit in the optical writing unit shown in FIG. 3.

To the stay 86 of the shielding unit 85, the driving unit 92 is connected, as shown in FIGS. 3 and 7. The driving unit 92 is mounted on the housing 65. The driving unit 92 includes the motor 93 as a power source and the set of gears 94 engaging with the motor 93. The driving unit 92 transfers rotary motion of the gear 94A to the lever 97 with the pin 96 engaging with the hole 95 on the stay 86 in order to convert the rotary motion into reciprocating motion in the direction B, an orthogonal direction to the pin 96. This moves the stay 86 in the direction B. It is to be noted, however, that a configuration of the driving unit 92 is not limited to the above example. For example, a solenoid may be adopted to move the stay 86.

As shown in FIG. 7, the driving unit 92 is provided with a sensor 98 for detecting whether the stay 86 covers the dustproof member 69 or not. In specific, the sensor 98 identifies a position of the stay 86 by detecting the protrusion 99 attached on an undersurface of the stay 86. The motor 93 and the sensor 98 of the driving unit 92 connect the control unit 100.

The control unit 100 including such as CPU, ROM, and RAM controls the motor 93 to drive or suspend based on signals from the control unit 50 of the image forming apparatus 1 and the sensor 98.

In the above configuration, each latent image formed on the photoconductor 6 with the optical writing device 4 is developed and visualized with corresponding colored toner of the developing unit 8. Each of the toner images of Y, M, C, or B color visualized is transferred onto a transferer by transfer unit. The transferer with four colored images transferred is conveyed to the fusing unit 20 to have the image fixed, and ejected onto the paper ejecting tray 22 by the paper ejecting rollers 21.

Preceding to the above described image forming operation in the image forming apparatus 1, the control unit 100 of the optical writing device 4 drives the motor 93 to move the shielding unit 85 to such a position that the shielding member 87 exposes and uncovers the dustproof member 69, as shown in FIG. 6A. This allows a light beam to pass through the opening 90 of the stay 86. Upon completion of the image forming operation in the image forming apparatus 1, the control unit 100 of the optical writing device 4 drives the motor 93 to move the shielding unit 85 to such a position that the shielding member 87 covers the dustproof member 69, as shown in FIG. 6B. Consequently, the dustproof member 69 is covered with the shield member 87 while the image forming operation is inactive. The above motion of the dustproof member 69 additionally causes the cleaning member 91 to clean off toner or dust on the dustproof member 69.

As described above, according to the present invention, the shielding member 87 covering the dustproof member 69 prevents toner or dust from adhering thereon, thereby reducing an amount of toner or dust adhering on the dustproof member 69.

While the image forming operation of the image forming apparatus 1 is inactive, the shielding member 87 is moved by the driving unit 92 to a position for covering the dustproof member 69, thereby preventing toner or dust from adhering onto the dustproof member 69. Consequently, it is possible to reduce an amount of toner or dusts adhering onto the dustproof member 69.

It is also possible to clean the dustproof member 69 with a simple configuration in which the cleaning member 91 is attached to the shielding member 87.

The configuration also enables easy assembly since the dustproof member 69 and the shielding member 87 are combined together for being mounted to the cover 67.

Furthermore, it is easy to install the optical writing device 4 into the image forming apparatus 1 since the driving unit 92 in attached to the optical writing device 4.

The present embodiment shows an exemplary configuration of single optical writing device 4 irradiating a plurality of the photoconductors 6 with light beams. However, the scope of the present invention is not limited within the above embodiment. A configuration is possible to include a plurality of optical writing devices each having the corresponding photoconductor 6. In this case, the configuration includes four photoconductors 6 and corresponding four optical writing devices 4, for example.

The present embodiment shows an example that a movement of the shielding unit 85 is solely caused by power of the driving unit 92. However, the scope of the present invention is not limited within the above embodiment. A configuration is possible, for example, in which the own weight of the shielding unit 85 or elastic force of a spring or the like places shielding member 87 at a position for covering the dustproof member 69 in a normal state, and the driving unit 92 moves the shielding unit 85 in order to uncover the dustproof member 69. Two forces in the above example may naturally be exchanged in other configurations.

Then, an exemplary variation of the present embodiment will now be described. In this variation, the driving unit 92 for moving the shielding unit 85 of the optical writing device 4 is not attached to the optical writing device 4, but to a main body side of the image forming apparatus 1, in specific, to the supporting member 18C of the paper feeding roller 18A, for example. The control unit 50 of the image forming apparatus 1 controls the driving unit 92. Specifically, preceding an image forming operation, the control unit 50 drives the motor 93 in order to move the shielding unit 85 to a position at which the shielding member 87 uncovers and exposes the dustproof member 69. Upon completion of the image forming operation, the control unit 50 drives the motor 93 to move the shielding unit 85 to such a position that the shielding member 87 covers the dustproof member 69. Consequently, the dustproof member 69 is covered with the shield member 87 while the image forming operation is inactive.

In the above variation, a size of the optical writing device 4 can be reduced since it does not require the driving unit 92 to be attached thereto. Incidentally, it is also possible to simplify a wiring harness of the driving unit 92 or the sensor 98.

As well as the driving unit 92, the shielding unit 85 including the shielding member 87 may also be attached to the image forming apparatus 1 other than the optical writing device 4. The shielding unit 85 may be attached to the main body 2 or the supporting member 18C of the paper roller 18A, for example.

Numerous additional modifications and variations are possible in light of the above teachings. It is therefore to be understood that within the scope of the appended claims, the disclosure of this patent specification may be practiced otherwise than as specifically described herein.

What is claimed is:

1. An optical writing device comprising:
   a housing having an opening;
   a dustproof member configured to be light permeable and close the opening;
   a light source installed in said housing and configured to irradiate an image carrier with a light beam through said dustproof member;
   a shield movable between a first position to cover said dustproof member and a second position to uncover said dustproof member; and
   a cleaner attached to said shield and arranged to contact at least a part of the dustproof member during the first and second positions.

2. The optical writing device according to claim 1, further comprising a driver for moving said shield.

3. The optical writing device according to claim 2, further comprising a positioning mechanism configured to position said shield to the first position by using said driver.

4. An image forming apparatus for electrophotographic image forming comprising:
   an image carrier for carrying an image formed with irradiation of a light beam; and
   an optical writing device comprising:
      a housing having an opening;
      a dustproof member configured to be light permeable and close the opening;
      a light source installed in said housing and configured to irradiate said image carrier with the light beam through said dustproof member;
      a shield movable between a first position to cover said dustproof member and a second position to uncover said dustproof member; and
      a cleaner attached to said shield and arranged to contact at least a part of the dustproof member during the first and second positions.

5. The image forming apparatus according to claim 4, wherein said optical writing device further comprises a driver for moving said shield.

6. The image forming apparatus according to claim 5, wherein said optical writing device further comprises a positioning mechanism configured to position said shield to the first position by using said driver while an image forming operation of the image forming apparatus is inactive.

7. The image forming apparatus according to claim 4, further comprising a driver for moving said shield.

8. The image forming apparatus according to claim 7, further comprising a positioning mechanism configured to position said shield to the first position by using said driver while an image forming operation of the image forming apparatus is inactive.

9. An image forming apparatus for electrophotographic image forming comprising:
   an image carrier configured to carry an image formed with irradiation of a light beam;
   an optical writing device comprising:
      a housing having an opening;
      a dustproof member configured to be light permeable and close the opening;
      a light source installed in said housing and configured to irradiate said image carrier with the light beam through said dustproof member;
      a shield movable between a first position to cover said dustproof member and a second position to uncover said dustproof member; and
      a cleaner attached to said shield and arranged to contact at least a part of the dustproof member during the first and second positions.

10. The image forming apparatus according to claim 9, further comprising a driver for moving said shield.

11. The image forming apparatus according to claim 10, further comprising a positioning mechanism configured to position said shield to the first position by using said driver while an image forming operation of the image forming apparatus is inactive.

12. An optical writing device comprising:
    a housing for enclosing an optical writing mechanism, said housing having an opening;
    dustproofing means for light-permeably shielding the opening;

light irradiating means for irradiating an external image carrier with a light beam through said dustproofing means;

shielding means for covering said dustproofing means during an inactive state of the optical writing mechanism and uncovering said dustproofing means during an active state; and cleaning means for cleaning an exterior of said dustproofing means and configured to contact at least a part of the dustproofing means during the active and inactive states.

13. The optical writing device according to claim 12, further comprising driving means for activating said shielding means.

14. The optical writing device according to claim 13, further comprising positioning means for positioning said shielding means by using said driving means when the optical writing mechanism is inactive.

15. An image forming apparatus for electrophotographic image forming, comprising:

image carrying means for carrying an image formed with irradiation of a light beam; and optical writing means comprising:

a housing for enclosing an optical writing mechanism, said housing having an opening;

dustproofing means for light-permeably closing the opening;

light irradiating means for irradiating said image carrying means with the light beam through said dustproofing means;

shielding means for covering said dustproofing means during an inactive state of the optical writing mechanism and uncovering said dustproofing means during an active state; and cleaning means for cleaning an exterior of said dustproofing means and configured to contact at least a part of the dustproofing means during the active and inactive states.

16. The image forming apparatus according to claim 15, wherein said optical writing means further comprises driving means for activating said shielding means.

17. The image forming apparatus according to claim 16, wherein said optical writing means further comprises positioning means for positioning said shielding means by using said driving means while an image forming operation of the image forming apparatus is inactive.

18. The image forming apparatus according to claim 15, further comprising driving means for activating said shielding means.

19. The image forming apparatus according to claim 18, further comprising positioning means for positioning said shielding means by using said driving means while an image forming operation of the image forming apparatus is inactive.

20. An image forming apparatus for electrophotographic image forming, comprising:

image carrying means for carrying an image formed with irradiation of a light beam;

optical writing means comprising:

a housing for enclosing an optical writing mechanism, said housing having an opening;

dustproofing means for light-permeably shielding the opening;

light irradiating means for irradiating said image carrying means with the light beam through said dustproofing means;

shielding means for covering said dustproofing means during an inactive state of the image forming apparatus and uncovering said dustproofing means during an active state; and cleaning means for cleaning an exterior of said dustproofing means and configured to contact at least a part of the dustproofing means during the active and inactive states.

21. The image forming apparatus according to claim 20, further comprising driving means for activating said shielding means.

22. The image forming apparatus according to claim 21, further comprising positioning means for positioning said shielding means by using said driving means while an image forming operation of the image forming apparatus is inactive.

23. An optical writing method comprising the steps of:

storing an optical writing mechanism into a housing having an opening;

closing the opening with a light-permeable dustproof member;

emitting a light beam from inside the housing for irradiating an external image carrier through the opening and the dustproof member;

moving a shield between a first position at which the shield covers the light-permeable dustproof member when the optical writing mechanism is inactivated, and a second position at which the shield uncovers the light-permeable dustproof member; and providing a cleaner to the shield in contact with at least a part of the light-permeable dustproof member configured to clean off an exterior of the light-permeable dustproof member when the shield is moved between the first and second positions in said moving step.

24. The optical writing method according to claim 23, wherein the shield is supported by a positioning member.

25. The optical writing method according to claim 24, wherein the supporting member is driven by a driver.

26. An image forming method for electrophotographic image forming, comprising the steps of:

carrying an image by an image carrier; and performing an optical writing method comprising the steps of:

storing an optical writing mechanism into a housing having an opening;

closing the opening with a light-permeable dustproof member;

emitting a light beam from inside the housing for irradiating the image carrier through the light-permeable dustproof member;

moving a shield between a first position at which the shield covers the light-permeable dustproof member when the image forming operation of the image forming method is inactivated, and a second position at which the shield uncovers the light-permeable dustproof member; and providing a cleaner to the shield in contact with at least a part of the light-permeable dustproof member configured to clean off an exterior of the light-permeable dustproof member when the shield is moved between the first and second positions in said moving step.

27. The image forming method according to claim 26, wherein the shield is supported by a positioning member.

28. The image forming method according to claim 27, wherein the supporting member is driven by a driver.

29. An image forming method for electrophotographic image forming, comprising the steps of:
  carrying an image by an image carrier;
  performing an optical writing method comprising the steps of:
    storing an optical writing mechanism into a housing having an opening;
    closing the opening with a light-permeable dustproof member;
    emitting a light beam from inside the housing through the light-permeable dustproof member;
    moving a shield between a first position at which the shield covers the light-permeable dustproof member when an image forming operation of the image forming method is inactivated, and a second position at which the shield uncovers the light-permeable dustproof member; and
    providing a cleaner to the shield in contact with at least a part of the light-permeable dustproof member configured to clean off an exterior of the light-permeable dustproof member when the shield is moved between the first and second positions in said moving step.

30. The image forming method according to claim 29, the shield is supported by a positioning member.

31. The image forming method according to claim 30, wherein the supporting member is driven by a driver.

* * * * *